US008678308B2

(12) United States Patent
Niitsuma et al.

(10) Patent No.: US 8,678,308 B2
(45) Date of Patent: Mar. 25, 2014

(54) DUAL-BEARING REEL DRAG SOUND PRODUCING DEVICE

(75) Inventors: Akira Niitsuma, Osaka (JP); Ken'ichi Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 543 days.

(21) Appl. No.: 12/987,696

(22) Filed: Jan. 10, 2011

(65) Prior Publication Data

US 2011/0180647 A1 Jul. 28, 2011

(30) Foreign Application Priority Data

Jan. 25, 2010 (JP) ................................. 2010-012965

(51) Int. Cl.
*A01K 89/01* (2006.01)
(52) U.S. Cl.
USPC ............ 242/306; 242/308; 242/307; 242/305
(58) Field of Classification Search
USPC ................................................. 242/305–309
See application file for complete search history.

(56) References Cited

U.S. PATENT DOCUMENTS

| | | | |
|---|---|---|---|
| 1,460,151 A | 6/1923 | Case | |
| 2,354,530 A | 7/1944 | Mcmahon | |
| 4,570,878 A * | 2/1986 | Nakajima | 242/261 |
| 4,673,143 A * | 6/1987 | Intengan | 242/396.9 |
| 6,189,822 B1 * | 2/2001 | Ikuta | 242/296 |
| 6,688,545 B2 * | 2/2004 | Kitajima et al. | 242/306 |
| 7,090,160 B2 * | 8/2006 | Morimoto et al. | 242/307 |
| 2005/0006512 A1 * | 1/2005 | Morimoto et al. | 242/306 |

FOREIGN PATENT DOCUMENTS

| | | |
|---|---|---|
| JP | H02-138564 U | 11/1990 |
| JP | 2535459 Y2 | 5/1997 |
| JP | 2006-180777 A | 7/2006 |

OTHER PUBLICATIONS

European Search Report of the corresponding European Application No. 10197000.2-1260, dated May 27, 2011.

* cited by examiner

*Primary Examiner* — Emmanuel M Marcelo
(74) *Attorney, Agent, or Firm* — Global IP Counselors (57) ABSTRACT

A reel drag sound producing device is provided for producing sound in conjunction with a drag function of a dual-bearing reel having a reel unit with a main gear. The drag sound producing device includes a rotation member being disposed in the reel unit to be rotated unitarily with the main gear, a pivot shaft being disposed in the reel unit, a hitting member being disposed onto the pivot shaft and to be moved between a silent position and a sound producing position, a drive mechanism being configured to move the hitting member in a first direction between the sound producing position and the silent position in conjunction with rotation of the main gear in a fishing-line winding direction and moved in a radial direction for a predetermined distance, and an urging member being configured to urge the hitting member towards the sound producing position.

7 Claims, 9 Drawing Sheets

DUAL-BEARING REEL DRAG SOUND PRODUCING DEVICE

CROSS-REFERENCE TO RELATED APPLICATIONS

This application claims priority to Japanese Patent Application No. 2010-012965 filed on Jan. 25, 2010. The entire disclosure of Japanese Patent Application No. 2010-012965 is hereby incorporated herein by reference.

BACKGROUND OF THE INVENTION

1. Field of the Invention

The present invention relates to a sound producing device, particularly to a dual-bearing reel drag sound producing device configured to produce sounds in conjunction with activation of a drag mechanism configured to wind a fishing line about an axis parallel to a handle shaft rotatably attached to a reel unit.

2. Background Art

The dual-bearing reels of some types include a drag sound producing device configured to inform an angler of drag activation. For example, Japan Examined Utility Model Registration No. JP-Y-2535459 describes a drag sound producing device configured to produce sounds only when a spool is rotated in a fishing-line releasing direction. The drag sound producing device of the well-known type includes a gear member, a hitting member, a drive mechanism and an urging member. The gear member (an example of a rotation member) is either a main gear or a gear configured to rotate in conjunction with the main gear. The hitting member is configured to make contact with or move away from the gear member. The drive mechanism is configured to separate the hitting member away from the gear member in conjunction with rotation of the gear member in the fishing-line winding direction. The urging member is configured to urge the hitting member. An interposed plate is attached to a claw member of a one-way clutch for moving the claw member away from a ratchet wheel in conjunction with rotation of a handle shaft in a fishing-line winding direction. The interposed plate is frictionally coupled to the ratchet wheel attached onto the handle shaft. The hitting member is pivotably attached to either the reel unit or the claw member of the one-way clutch. The claw member, functioning as a drive mechanism, is configured to cause the hitting member to pivot between a contact position and a remote position depending on the spool rotational direction.

According to the drag sound producing device with the aforementioned structure, the hitting member is moved to the remote position by the claw member in conjunction with the spool rotation in the fishing-line winding direction. The drag sound producing device does not produce sounds. When the spool is rotated in the fishing-line releasing direction, on the other hand, the claw member is engaged with the ratchet wheel. The handle shaft is thereby prevented from rotating. The main gear, which rotates in the fishing-line releasing direction, is braked and the drag function is performed by the drag mechanism. When the main gear is rotated in the fishing-line releasing direction under the activation of the drag mechanism, the hitting member is moved to the contact position by the claw member. When being disposed in the contact position, the hitting member is urged by the urging member and vibrated in conjunction with the main gear rotation in the fishing-line releasing direction. The drag sound producing device thus produces sounds.

According to the well-known structure, the hitting member is pivotably attached to either the reel unit or the claw member. A so-called stuck phenomenon may be thereby produced immediately before the drag sound producing device produces sounds when the main gear is reversely rotated in the fishing-line releasing direction. The stuck phenomenon herein refers to a phenomenon that the gear member is prevented from rotating for a short period of time when the urging member urges the hitting member and accordingly the tip of the hitting member makes contact with the tip of a given tooth of the gear member. When the stuck phenomenon is produced, the drag mechanism may be awkward to operate and prevented from smoothly operating. Further, abrasion may be caused on either the tip of the hitting member or the teeth tips of the gear member when the stuck phenomenon is produced.

The present invention addresses a need to provide a dual-bearing reel drag sound producing device for allowing a drag mechanism to smoothly operate and simultaneously reducing abrasion of either a rotation member or a hitting member.

SUMMARY OF THE INVENTION

A reel drag sound producing device for producing sound in conjunction with a drag function of a dual-bearing reel having a reel unit with a main gear includes a rotation member, a pivot shaft, a hitting member, a drive mechanism, and an urging member. The rotation member is disposed in the reel unit to be rotated unitarily with the main gear. The rotation member includes a plurality of sound producing convexes circumferentially aligned on an outer peripheral surface of the rotation member at a predetermined interval. The pivot shaft is disposed in the reel unit. The hitting member is disposed onto the pivot shaft. The hitting member is disposed to be moved between a silent position and a sound producing position, is separated at the silent position from the sound producing convexes. The hitting member is in contact at the sound producing position with the sound producing convexes to produce the sound with the drag function. The drive mechanism is configured to move the hitting member in a first direction between the sound producing position and the silent position in conjunction with rotation of the main gear in a fishing-line winding direction and moved in a radial direction for a predetermined distance. The urging member is configured to urge the hitting member towards the sound producing position.

BRIEF DESCRIPTION OF THE DRAWINGS

Referring now to the attached drawings which form a part of this original disclosure.

DETAILED DESCRIPTION OF THE EMBODIMENTS

General Reel Structure

Figure 1:
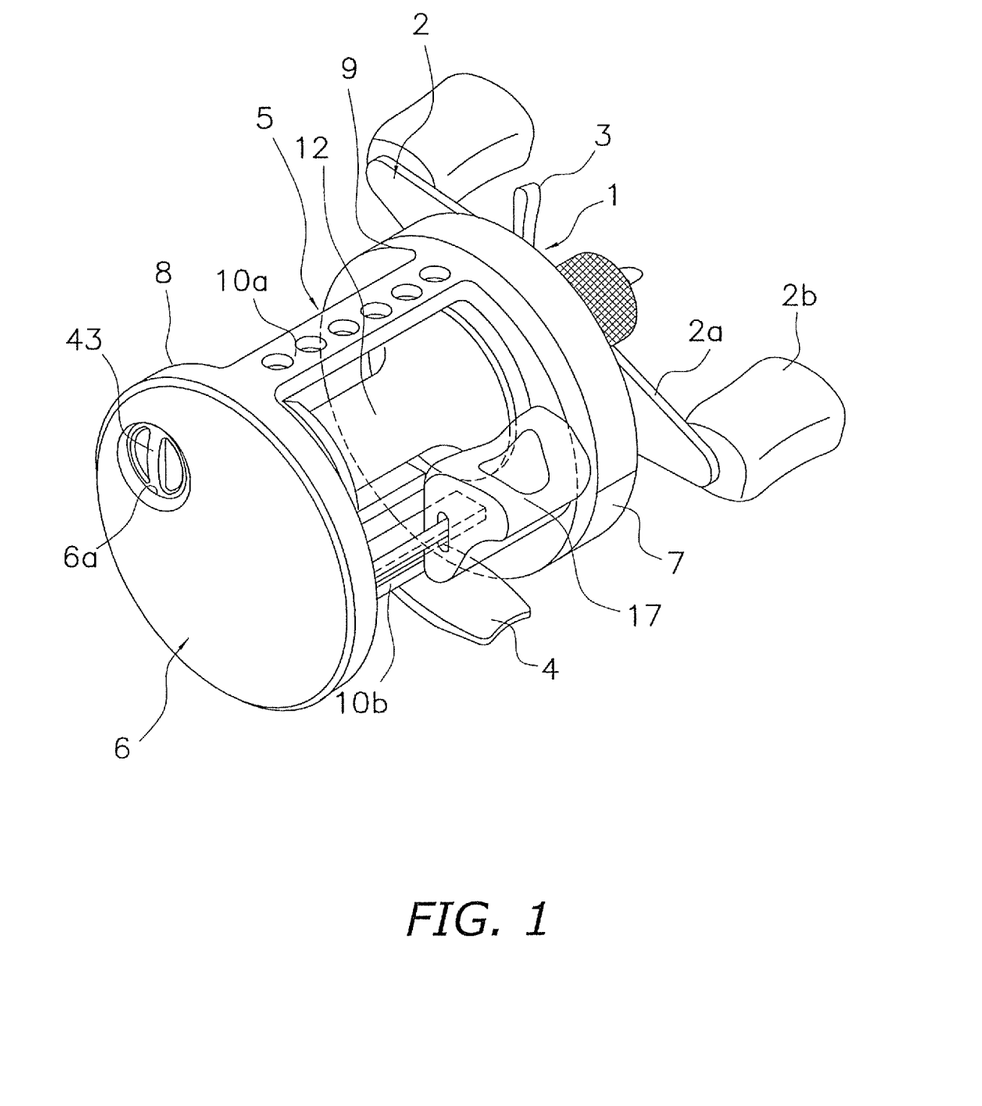
FIG. 1 is a perspective view of a dual-bearing reel adopting an exemplary embodiment of the present invention.
Figure 2:
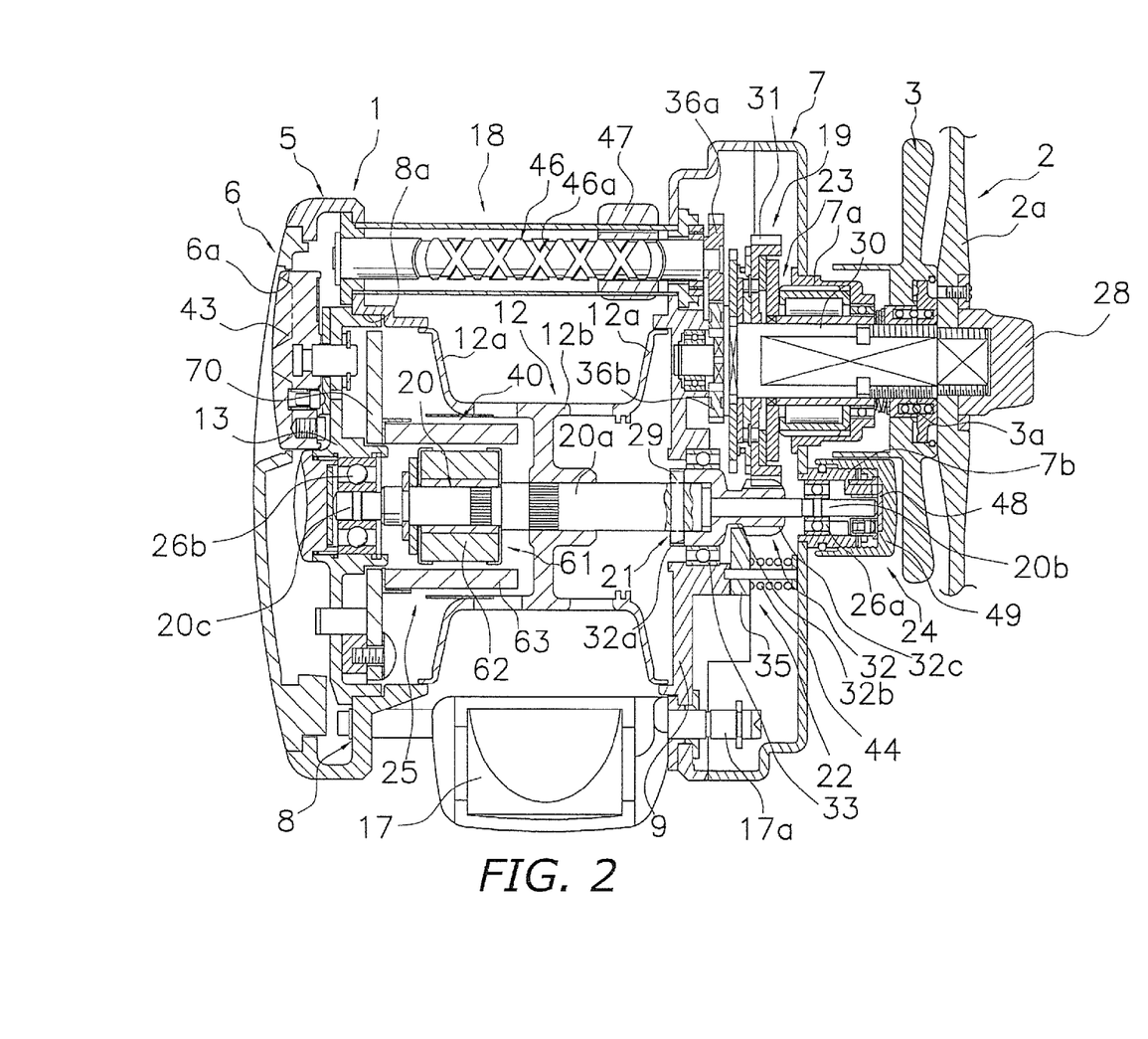
FIG. 2 is a cross-sectional planar view of the dual-bearing reel.

As illustrated in FIGS. 1 and 2, a dual-bearing reel adopting an exemplary embodiment of the present invention is a round bait-casting dual-bearing reel. The dual-bearing reel includes a reel unit 1, a handle 2 and a star drag 3. The handle 2 is disposed on the lateral side of the reel unit 1 for a spool rotation purpose. The star drag 3 is disposed on the lateral side of the handle 2 while being adjacent to the reel unit 1.

The handle 2 is of a double-handle type including a plate-shaped arm 2a and a pair of knobs 2b. The respective knobs 2b are rotatably attached to the ends of the arm 2a. As illustrated in FIG. 2, the arm 2a is attached onto a distal end of a handle shaft 30 while being unitarily rotatable therewith. The arm 2a is fixed to the handle shaft 30 by a nut 28.

The reel unit 1 is a member made of metal such as aluminum alloy or magnesium alloy. The reel unit 1 includes a frame 5, a first side cover 6, and a second side cover 7. The first and second side covers 5, 6 are attached to the both lateral sides of the frame 5. The reel unit 1 includes a spool 12 configured to wind a fishing line thereon. The spool 12 is rotatably attached to the reel unit 1 through a spool shaft 20 (see FIG. 2). As it is shown from the outside in a spool shaft direction, the first side cover 6 has a circular shape whereas the second side cover 7 has a shape formed by two intersecting circles. The first side cover 6 is attached to the frame 5 while being allowed to be opened and closed. The first side cover 6 is supported by the frame 5 and allowed to pivot after being axially separated outwardly from the frame 5 when being opened and closed. The first side cover 6 is allowed to be opened (or closed) in conjunction with detachment (or attachment) of a screw member (not illustrated in the figures) provided for the second side cover 7. The first side cover 6 includes a circular opening 6a for allowing a regulation knob 43 described below to be disposed therein. The second side cover 7 supports the handle shaft 30 while allowing the handle shaft 30 to rotate.

Figure 3:
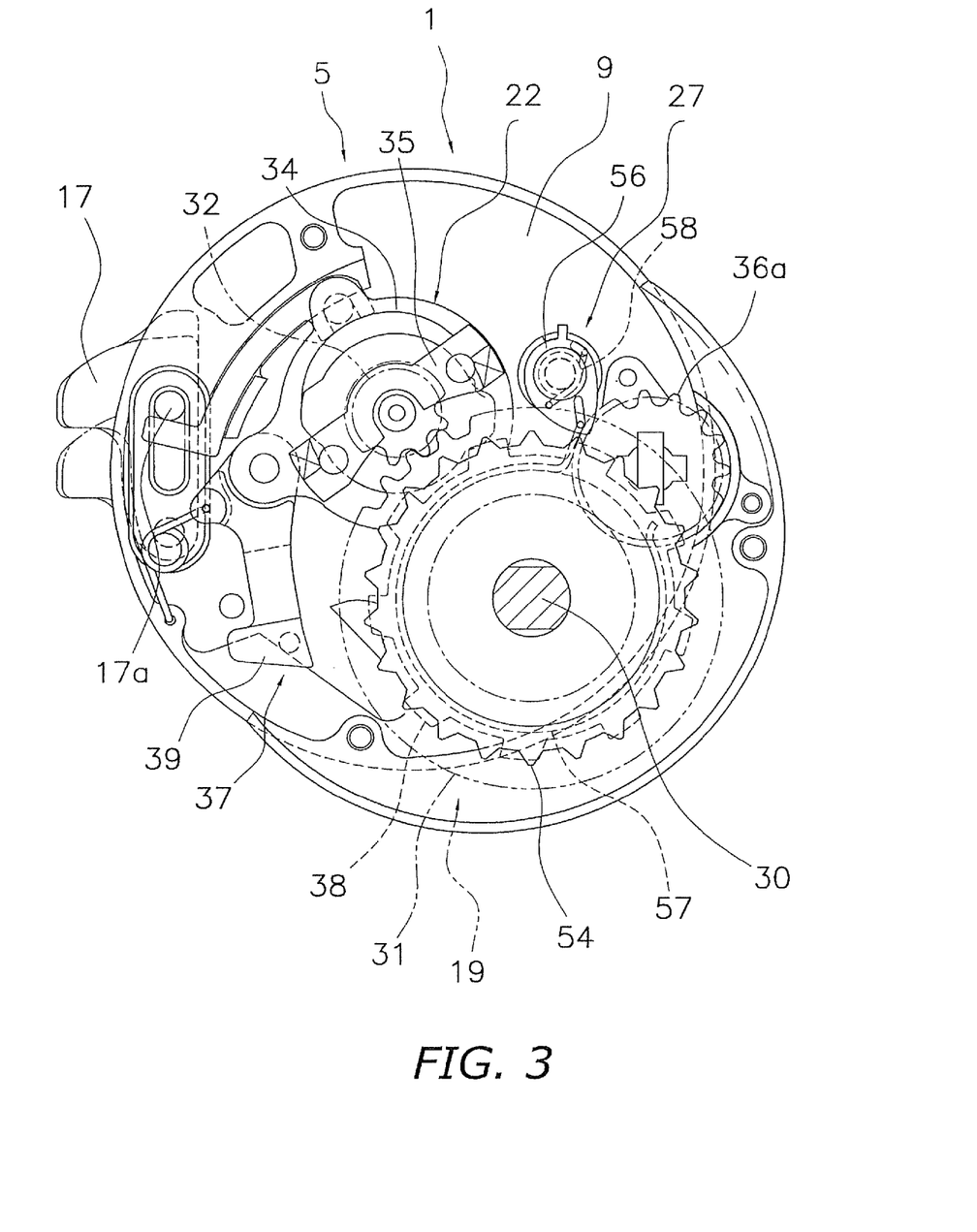
FIG. 3 is a side view of the dual-bearing reel under a condition in which a second side cover is removed.

As illustrated in FIG. 2, the frame 5 contains the spool 12, a clutch lever 17 and a level wind mechanism 18. The clutch lever 17 functions as a thumb pad in thumbing the fishing line. The level wind mechanism 18 is configured to uniformly wind the fishing line onto the spool 12. As illustrated in FIGS. 2 and 3, a gear mechanism 19, a clutch mechanism 21, a clutch control mechanism 22, a drag mechanism 23, a casting control mechanism 24, and a drag sound producing mechanism (an example of a drag sound producing device) 27 are disposed in the space between the frame 5 and the second side cover 7. The gear mechanism 19 is configured to transmit rotational force from the handle 2 to the spool 12 and the level wind mechanism 18. The clutch mechanism 21 is configured to couple/decouple the handle 2 and the spool 12. When the clutch mechanism 21 is set to be in a clutch off state (i.e., a decoupled state), the spool 12 is allowed to freely rotate. The clutch control mechanism 22 is configured to control and set the clutch mechanism 21 in either a clutch on state (i.e., a coupled state) and the clutch off state (i.e., the decoupled state) in response to an operation of the clutch lever 17. The drag mechanism 23 is configured to brake rotation of the spool 12 in a fishing-line releasing direction. The casting control mechanism 24 is configured to regulate resistance produced in rotation or the spool 12. The drag sound producing mechanism 27 is configured to produce sounds when the spool 12 is rotated in the fishing-line releasing direction. Further, an electronic control brake mechanism 25 is disposed between the frame 5 and the first side cover 6 for inhibiting occurrence of backlash in casting.

As illustrated in FIG. 1, the frame 5 includes a first side plate 8, a second side plate 9, a top coupling portion 10a, and a pair of bottom coupling portions 10b. The first and second side plates 8, 9 are opposed to each other at a predetermined distance. The first and second side plates 8, 9 are integrally coupled by the top and bottom coupling portions 10a, 10b. The first side plate 8 includes a stepped circular opening 8a (see FIG. 2) positioned slightly higher than the center portion thereof. A spool support portion 13, which forms a part of the reel unit 1, is fixed to the opening 8a by screws.

As illustrated in FIG. 1, the top coupling portion 10a is disposed on a plane including the outer peripheries of the first and second side plates 8, 9. The bottom coupling portions 10b are aligned back and forth while being disposed inside from the outer peripheries of the first and second side plates 8, 9. A fishing-rod attachment leg 4 is fixed to the bottom coupling portions 10b by rivets. The fishing-rod attachment leg 4 is a member elongated back and forth for attaching the reel onto the fishing rod. The fishing-rod attachment leg 4 is made of metal such as aluminum alloy.

As illustrated in FIG. 2, the spool 12 includes a pair of flanges 12a and a bobbin trunk 12b. The flanges 12a are saucer-shaped portions formed on the both axial lateral sides of the spool 12. The bobbin trunk 12b is a tubular portion formed between the flanges 12a. The outer peripheral surface of the left-side flange 12a (see FIG. 2) is disposed on the inner peripheral side of the opening 8a, while being separated from the inner periphery of the opening 8a at a slight clearance for preventing the fishing line from being tangled. The spool 12 is non-rotatably fixed to the spool shaft 20 penetrating the inner periphery of the bobbin trunk 12b by serration coupling, for example. The method of fixing the spool 12 to the spool shaft 20 is not limited to serration coupling. A variety of coupling methods (e.g., key coupling or spline coupling) may be used for coupling the spool 12 to the spool shaft 20.

As illustrated in FIG. 2, the spool shaft 20 is disposed in parallel to the handle shaft 30. The spool shaft 20 is made of non-magnetic metal such as SUS304. The spool shaft 20 extends outwardly of the second side cover 7 while penetrating the second side plate 9. The extended end of the spool shaft 20 is rotatably supported by a second boss 7b through a first bearing 26a. The second boss 7b is attached to the second side cover 7 while being protruding outwardly. On the other hand, the other end of the spool shaft 20 is rotatably supported by a second bearing 26b. The spool shaft 20 includes a large-diameter portion 20a, a first small-diameter portion 20b and a second small-diameter portion 20c. The large-diameter portion 20a is positioned in the axial center part of the spool shaft 20. The first and second small-diameter portions 20b, 20c are formed on the both axial ends of the spool shaft 20. The first small-diameter portion 20b is supported by the first bearing 26a, whereas the second small-diameter portion 20c is supported by the second bearing 26b.

Further, a plurality of magnets 62 of the brake mechanism 25 are attached onto a portion positioned between the left-side second small-diameter portion 20c (see FIG. 2) and the large-diameter portion 20a. The portion attaching the magnets 62 thereon has an outer diameter greater than the outer diameter of the second small-diameter portion 20c but less than the outer diameter of the large-diameter portion 20a. The right end of the large-diameter portion 20a of the spool shaft 20 is disposed in a position where the spool shaft 20 penetrates the second side plate 9. An engaging pin 29, forming a part of the clutch mechanism 21, is fixed therein. The engaging pin 29 penetrates the large-diameter portion 20a along the diameter of the large-diameter portion 20a. The both ends of the engaging pin 29 are radially protruding from the large-diameter portion 20a.

The clutch lever 17 is disposed on the rear part of the interposed space between the first side plate 8 and the second side plate 9. Simultaneously, the clutch lever 17 is disposed rearwards of the spool 12. The clutch lever 17 is configured to slide up and down between the first side plate 8 and the second side plate 9. The clutch lever 17 includes an engagement shaft 17a. The engagement shaft 17a is integrally formed with a lateral side of the clutch lever 17 where the handle 2 is attached. The engagement shaft 17a penetrates the second side plate 9. The engagement shaft 17a is engaged with the clutch control mechanism 22.

As illustrated in FIG. 2, the level wind mechanism 18 is disposed at a front side of the spool 12 while being interposed between the first side plate 8 and the second side plate 9. The level wind mechanism 18 includes a helical shaft 46 and a fishing-line guide portion 47. The helical shaft 46 includes intersecting helical grooves 46a on the outer peripheral surface thereof. The fishing-line guide portion 47 is configured to reciprocate along the spool shaft direction in conjunction with the helical shaft 46 in order to guide the fishing line. A first gear member 36a, forming a part of the gear mechanism 19, is attached onto the right end of the helical shaft 46 (see FIG. 2). The first gear member 36a meshes with a second gear member 36b non-rotatably attached onto the handle shaft 30. With the aforementioned structure, the helical shaft 46 is configured to rotate in conjunction with rotation of the handle shaft 30 in a fishing-line winding direction. In conjunction with rotation of the helical shaft 46, the fishing-line guide portion 47 reciprocates along the spool shaft direction.

The gear mechanism 19 includes the handle shaft 30, a main gear 31, a pinion gear 32, the first gear member 36a and the second gear member 36b. The main gear 31 is fixed to the handle shaft 30. The pinion gear 32 is a tubular gear meshing with the main gear 31. The handle shaft 30 is rotatably attached to the second side plate 9
through a bearing 15 and the second side cover 7 through a bearing 16 (see FIG. 5). The handle shaft 30 is prevented from reversely rotating in the fishing-line releasing direction by a roller-type one-way clutch 86.

Figure 5:
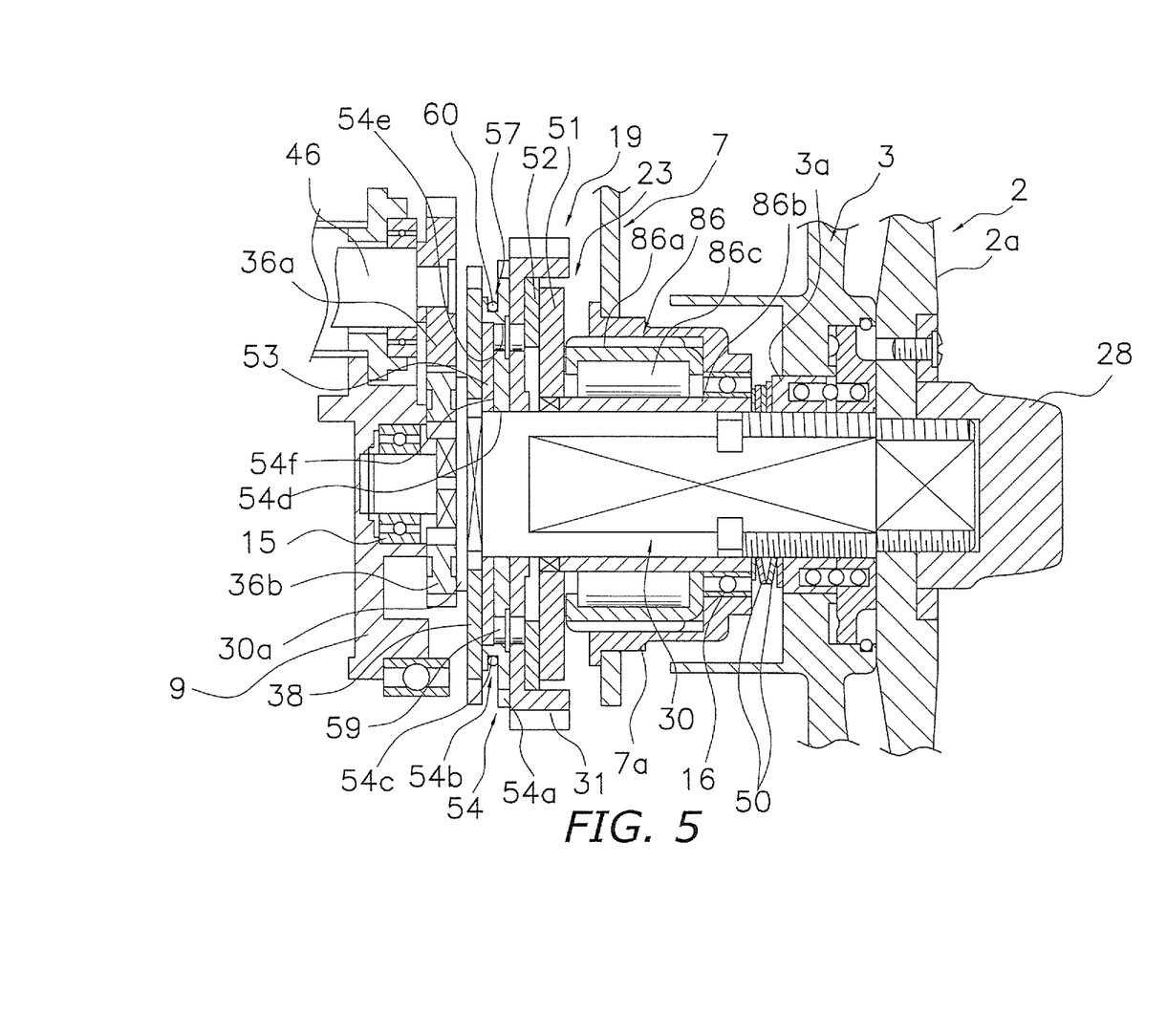
FIG. 5 is a cross-sectional fragmental view of the drag mechanism.

As illustrated in FIG. 5, the one-way clutch 86 is attached between the second side cover 7 and the handle shaft 30. The one-way clutch 86 includes an outer race 86a, an inner race 86b and a rolling element 86c. The outer race 86a is non-rotatably attached to a first boss 7a. The first boss 7a is attached to the second side cover 7 while being protruding outwardly. On the other hand, the inner race 86b is non-rotatably coupled to the handle shaft 30. The rolling element 86c is allowed to be locked between the outer race 86a and the inner race 86b. The main gear 31 is rotatably attached onto the handle shaft 30. Specifically, the main gear 31 is frictionally coupled to the handle shaft 30 through the drag mechanism 23.

The pinion gear 32 is a tubular member allowing the spool shaft 20 to penetrate the center part thereof. The pinion gear 32 is extended from the outside to the inside of the second side plate 9. The pinion gear 32 is attached onto the spool shaft 20 while being allowed to axially move. Further, the left end of the pinion gear 32 (see FIG. 2) is supported by the second side plate 9 through a bearing 33 while being allowed to rotate and axially move. Further, the left end of the pinion gear 32 (see FIG. 2) includes an engaged groove 32a allowing the engaging pin 29 to be engaged therewith. The engaged groove 32a and the engaging pin 29 form the clutch mechanism 21. Further, the pinion gear 32 includes a constricted portion 32b in the intermediate part thereof. Yet further, the pinion gear 32 includes a gear portion 32c meshing with the main gear 31 on the right end thereof.

As illustrated in FIGS. 2 and 3, the clutch control mechanism 22 includes a clutch yoke 35 and a clutch cam 34. The clutch yoke 35 is engaged with the constricted portion 32b of the pinion gear 32 for moving the pinion gear 32 along the direction of the spool shaft 20. The clutch cam 34 is configured to move the clutch yoke 35 between a clutch on position and a clutch off position in response to a slide position of the clutch lever 17. The clutch cam 34 is engaged with the engagement shaft 17a. The clutch cam 34 is configured to rotate about the spool shaft 20 in conjunction with movement of the clutch lever 17 from the clutch on position depicted with a solid line to the clutch off position depicted with a dashed two-dotted line (see FIG. 3). When thus rotating, the clutch cam 34 is configured to move the clutch yoke 35 outwardly along the spool shaft direction (i.e., rightwards in FIG. 2). A coil spring 44 (see FIG. 2) herein urges the clutch yoke 35 inwards along the spool shaft direction (i.e., towards a clutch on direction).

Figure 4:
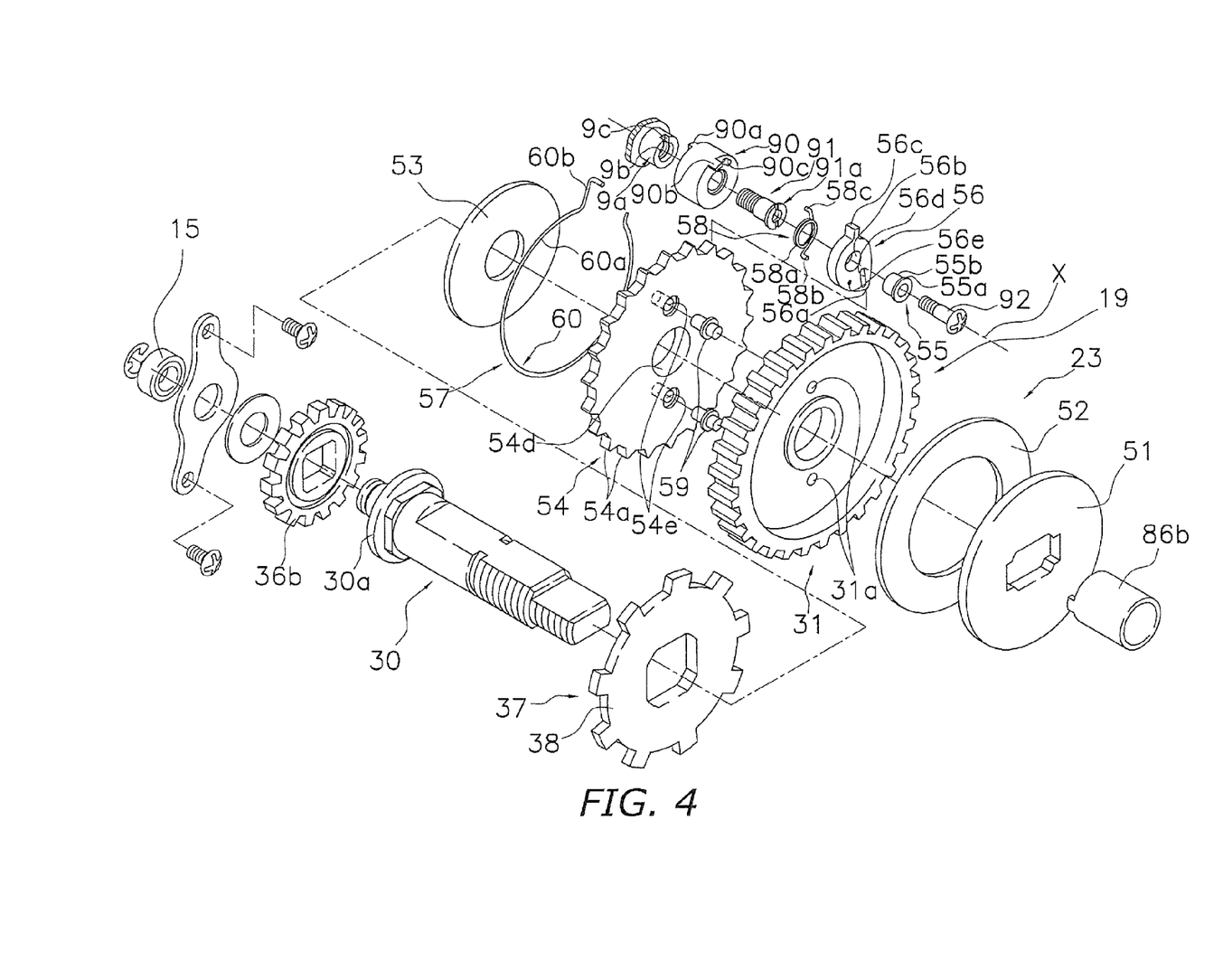
FIG. 4 is an exploded perspective view of a rotation transmission mechanism including a drag sound producing mechanism and a drag mechanism.

As illustrated in FIG. 4, the clutch control mechanism 22 includes a clutch return mechanism 37. The clutch return mechanism 37 is configured to set the clutch mechanism 21 in the clutch on state in conjunction with rotation of the handle 2 in the fishing-line winding direction. The clutch return mechanism 37 includes a ratchet wheel 38 (see FIGS. 2 and 4) and a return claw 39. The ratchet wheel 38 is attached onto the handle shaft 30 while being allowed to unitarily rotate therewith. The return claw 39 is configured to be pressed by the ratchet wheel 38. In the clutch return mechanism 37, the return claw 39 is configured to operate and return the clutch cam 34 to the clutch on position in conjunction with rotation of the ratchet wheel 38 in the fishing-line releasing direction. The clutch yoke 35 is accordingly returned to the clutch on position and the pinion gear 32 is moved leftwards in FIG. 2. The clutch mechanism 21 is thereby set in the clutch on state.

As illustrated in FIG. 2, the casting control mechanism 24 includes a plurality of friction plates 48 and a brake cap 49. The friction plates 48 abut to the both ends of the spool shaft 20 from the axial outside of the spool shaft 20. The brake cap 49 is configured to regulate abutting pressure of the friction plates 48 against the spool shaft 20. The left-side friction plate 48 is attached within the spool support portion 13. The brake cap 49 is screwed onto the outer peripheral surface of the second boss 7b of the second side cover 7.

As illustrated in FIG. 2, the brake mechanism 25 includes a spool brake unit 40, a rotation speed sensor (not illustrated in the figures), the regulation knob 43 and a spool control unit (not illustrated in the figures). The spool control unit 40 is mounted on both the spool 12 and the reel unit 1. The spool control unit is a microcomputer configured to electrically control the spool brake unit 40 in response to an operation position of the regulation knob 43. The spool brake unit 40 is an electrically controllable unit configured to brake the spool 12 by using power. The spool brake unit 40 includes a rotor 61, a plurality of (e.g., four) coils 63 and a switching element (not illustrated in the figures). The rotor 61 includes four magnets 62 aligned along the rotational direction of the spool shaft 20. The coils 63 are serially connected and opposed to each other in the surrounding of the outer periphery of the rotor 61. The switching element is connected to the both ends of the serially-connected coils 63. The rotation speed sensor is disposed for detecting the rotational speed of the spool 12 and computing the tension of the spool 12 based on the detected rotational speed. The spool control unit is embedded with a circuit substrate 70 fixed to the spool support portion 13. The regulation knob 43 is rotatably attached to the spool support portion 13.

Drag Mechanism Structure

As illustrated in FIG. 2, the drag mechanism 23 is configured to change drag force in response to an operational position of the star drag 3. The drag mechanism 23 is allowed to regulate and brake rotation of the spool 12 in the fishing-line releasing direction. The star drag 3 includes a nut portion 3a screwed onto the handle shaft 30.

The drag mechanism 23 is disposed about the handle shaft 30. As illustrated in FIGS. 4 and 5, the drag mechanism 23 includes a plurality of (e.g., two) disc springs 50, a first drag disc 51, a second drag disc 52 and a third drag disc 53. The disc springs 50 and the first to third drag discs 51 to 53 are pressed by the nut portion 3a of the star drag 3. The disc springs 50 are disposed between the star drag 3 and the inner race 86b. The disc springs 50 is configured to transmit spring force to the first drag disc 51 through the inner race 86b by changing axial movement of the star drag 3. The first drag disc 51 is coupled to the handle shaft 30 while being unitarily rotatable therewith. Further, the first drag disc 51 is coupled to and axially makes contact with the inner race 86b while being allowed to unitarily rotate therewith. With the structure, the inner race 86b is allowed to unitarily rotate with the handle shaft 30. The second drag disc 52 makes contact with the main gear 31 and the first drag disc 51 while being interposed therebetween. The third drag disc 53 is contained in a rotation member 54 to be described while making contact with the rotation member 54 and the ratchet wheel 38. The second drag disc 52 and the third drag disc 53 are allowed to rotate with respect to the handle shaft 30. The ratchet wheel 38 also functions as a part of the drag mechanism 23. The ratchet wheel 38 is positioned to make contact with a large-diameter flanged portion 30a formed on the outer peripheral surface of the handle shaft 30. The ratchet wheel 38 receives pressure of the star drag 3 through the flanged portion 30a.

Drag Sound Producing Mechanism Structure

Figure 6:
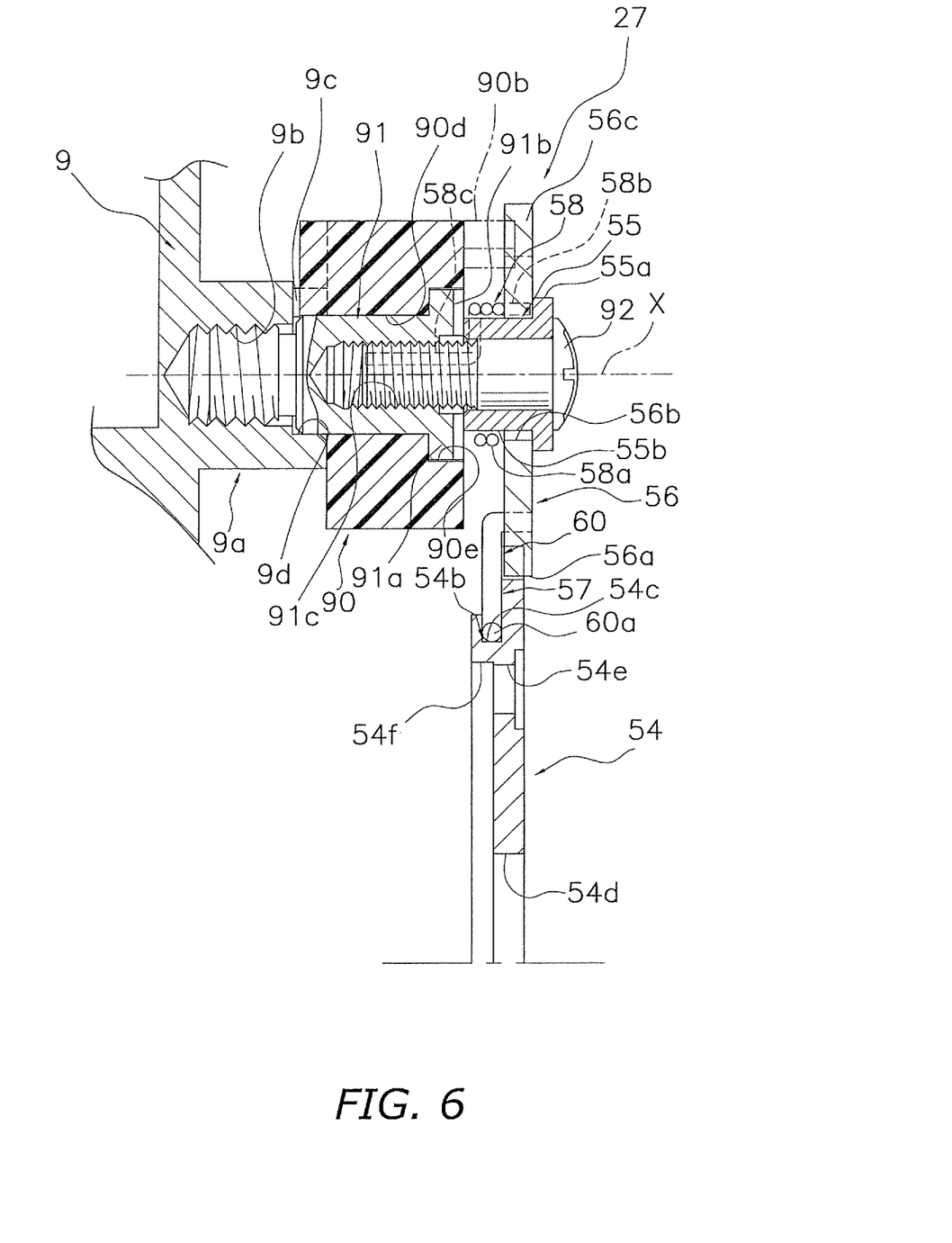
FIG. 6 is a cross-sectional fragmental view of the drag sound producing mechanism.

As illustrated in FIGS. 4 and 6, the drag sound producing mechanism 27 of an exemplary embodiment of the present invention includes the rotation member 54, a pivot shaft 55, a hitting member 56, a drive mechanism 57 and an urging member 58. The rotation member 54 is attached about the handle shaft 30 while being unitarily rotatable with the main gear 31 for producing sounds. The pivot shaft 55 is attached to the reel unit 1.

As illustrated in FIGS. 4 and 5, the rotation member 54 is a disc member rotatably attached onto the handle shaft 30. The rotation member 54 is made of metal such as stainless alloy. The rotation member 54 includes a plurality of sound producing convexes 54a on the outer peripheral surface thereof. The sound producing convexes 54a are circumferentially aligned at predetermined intervals. Each sound producing convex 54a has, for instance, a wedge shape. The rotation member 54 includes a member attachment portion 54b (see FIGS. 5 and 6) on the back surface thereof (i.e., the surface opposed to the ratchet wheel 38) for attaching the drive mechanism 57 thereto. The member attachment portion 54b has a diameter less than the diameter of the circumference formed by the sound producing convexes 54a. The member attachment portion 54b includes an annular attachment groove 54c. Further, the rotation member 54 includes a through hole 54d in the center thereof for allowing the handle shaft 30 to penetrate therethrough. The rotation member 54 includes two coupling holes 54e radially between the through hole 54d and the outer peripheral surface thereof. The rotation member 54 is coupled to the main gear 31 through the coupling holes 54e for unitarily rotating therewith. Each coupling hole 54e is a stepped hole having a large-diameter portion and a small-diameter portion. A coupling pin 59 having a large-diameter portion disposed therebetween is attached into each coupling hole 54e. Each coupling pin 59 is fitted into one of two coupling hole 54e and one of two coupling holes 31 formed in the main gear 31 for allowing the rotation member 54 to unitarily rotate with the main gear 31 in the same direction. Further, the member attachment portion 54b includes a disc container portion 54f on the inner peripheral side thereof. The disc container portion 54f is circularly recessed for containing the third drag disc 53 therein.

As illustrated in FIGS. 4 and 6, the pivot shaft 55 supports the hitting member 56 for allowing the hitting member 56 to pivot. The pivot shaft 55 is a hollow bushing member made of metal such as stainless alloy. The pivot shaft 55 includes a large-diameter flanged portion 55a and a small-diameter pivot support portion 55b.

The second side plate 9 of the frame 5 includes a tubular shaft attachment boss 9a protruding towards the second side cover 7. An attachment collar 90 is fixed to the shaft attachment boss 9a by a collar fixation bolt 91. The attachment collar 90 and the collar fixation bolt 91 form a part of the second side plate 9 of the reel unit 1. The pivot shaft 55 is fixed to the collar fixation bolt 91. The shaft attachment boss 9a includes a first female threaded portion 9b for screwing the collar fixation bolt 91 therein. Further, the shaft attachment boss 9a includes a positioning slit 9c formed for setting the attachment collar 90 in an appropriate circumferential position. Yet further, an axis alignment portion 9d is formed for executing axis alignment for the collar fixation bolt 91.

The attachment collar 90 is a member made of synthetic resin such as polyacetal. The attachment collar 90 is disposed for restricting a pivot range of the hitting member 56 and for allowing a second end 58c of the urging member 58 to be engaged therewith. The attachment collar 90 includes a first positioning protrusion 90a radially formed on the rear surface thereof (i.e., the surface opposed to the shaft attachment boss 9a) for allowing the first positioning protrusion 90a to be engaged with the positioning slit 9c. The attachment collar 90 includes a second positioning protrusion 90b protruding in a circular-arc shape on the front surface thereof for setting the hitting member 56 in an appropriate position (i.e., a silent position). Further, the attachment collar 90 includes a holding recess 90c in the vicinity of the second positioning protrusion 90b for allowing the second end 58c of the urging member 58 to hold therein. The holding recess 90c is recessed along a circular-arc formed about a pivot center X. The holding recess 90c has a width in a range of one-and-a-half to double the wire diameter of the urging member 58. As illustrated in FIG. 6, the attachment collar 90 includes an axis-aligned hole 90d and a head container portion 90e in the center thereof. Axis alignment of the attachment collar 90 is executed by the collar fixation bolt 91 through the axis-aligned hole 90d. The head container portion 90e has a diameter greater than the diameter of the axis-aligned hole 90d.

The collar fixation bolt 91 is a bolt member having a large-diameter head 91a to be contained in the head container portion 90e. The head 91a of the collar fixation bolt 91 includes a tool fitting portion 91b for fitting a tool such as a screwdriver therein. The tool fitting portion 91b has, for instance, a minus-sign shape (i.e., a slot shape). The head 91a of the collar fixation bolt 91 includes a second female threaded portion 91*c* on the center thereof. A shaft fixation bolt 92 is screwed into the second female threaded portion 91*c*. The hitting member 56 is pivotably attached to the reel unit 1 by the shaft fixation bolt 92.

Figure 7:
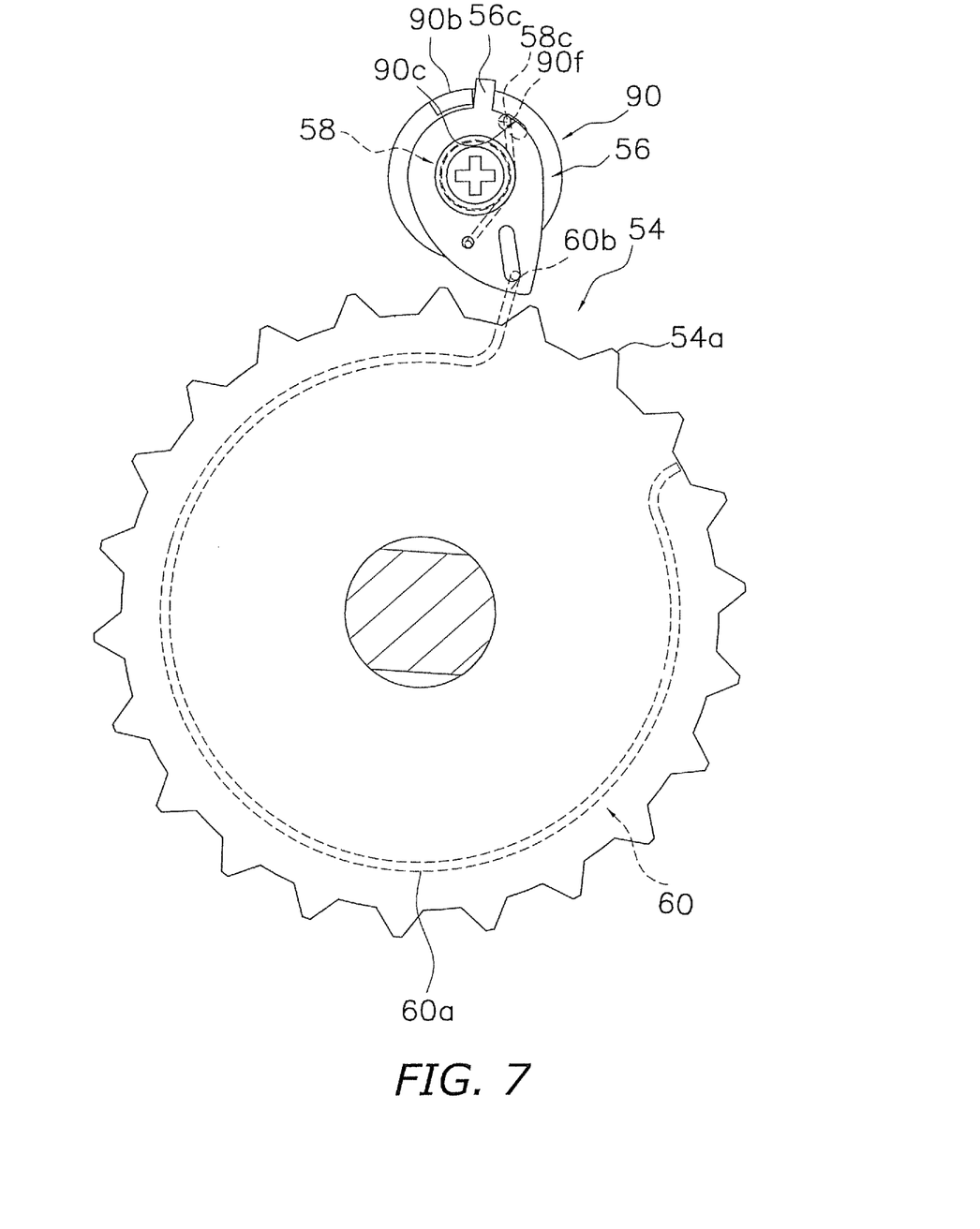
FIG. 7 is a front view of the drag sound producing mechanism under a condition in which a hitting member is disposed in a silent position.
Figure 8:
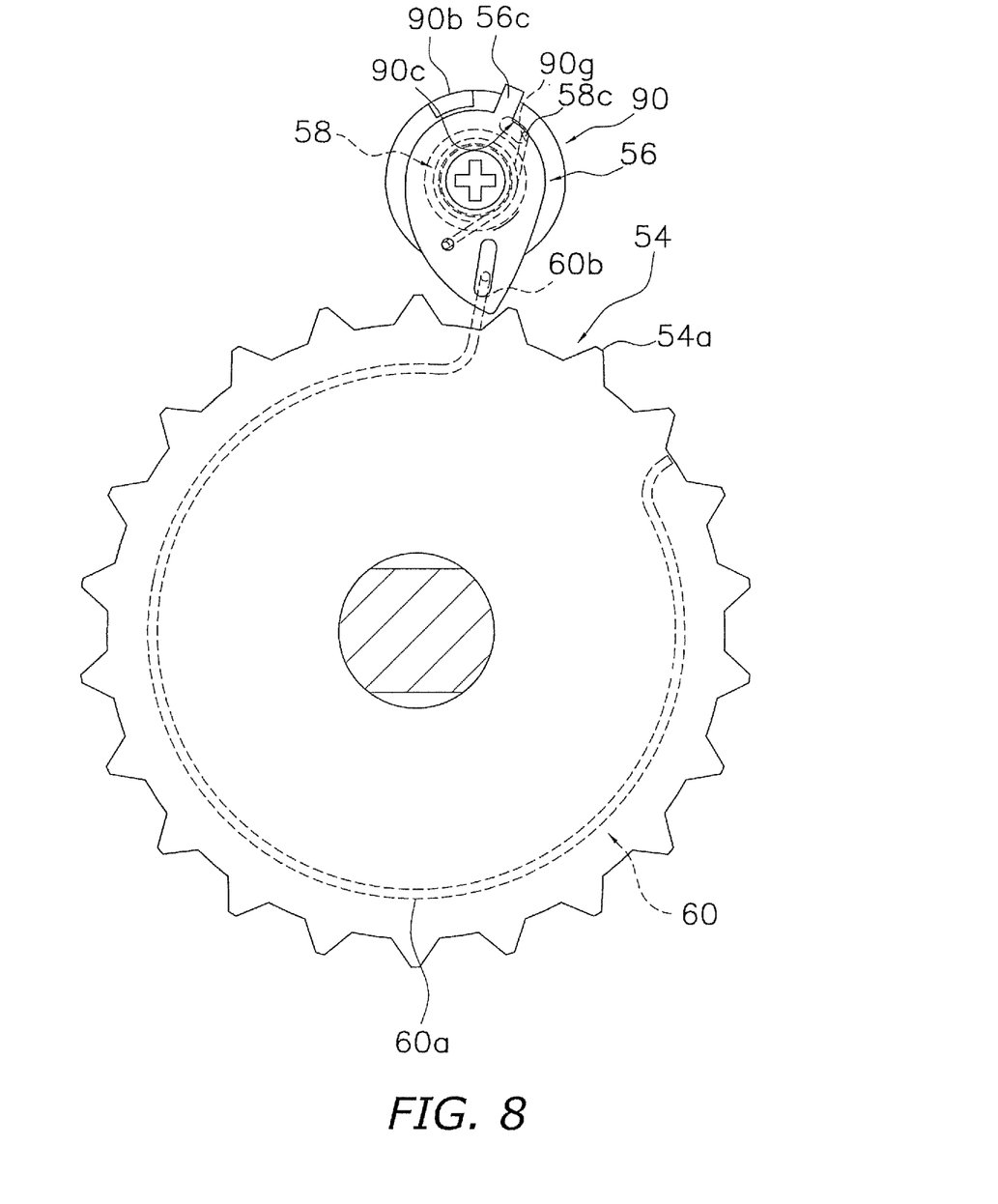
FIG. 8 is a front view of the drag sound producing mechanism under a condition in which the hitting member is disposed in a sound producing position.

The hitting member 56 is attached onto the pivot shaft 55 while being allowed to pivot between a silent position and a position where the hitting member 56 pivots opposite to the silent position across a sound producing position. In the silent position, the hitting member 56 is separated away from the sound producing convexes 54*a* as illustrated in FIG. 7. In the sound producing position, on the other hand, the hitting member 56 is allowed to make contact with the sound producing convexes 54*a* as illustrated in FIG. 8. The hitting member 56 is a roughly raindrop-shaped plate member made of metal such as stainless alloy. The drag sound producing mechanism 27 is configured to produce sounds only in rotation of the fishing-line releasing direction. Therefore, the hitting member 56 has a transversely asymmetrical shape. As illustrated in FIG. 4, the hitting member 56 includes an off-centered pointed claw portion 56*a* having a small curvature radius on the tip thereof. When the outer periphery of the hitting member 56 is divided into two sections through the claw portion 56*a*, the divided sections have different curvature radiuses.

The hitting member 56 includes an attachment hole 56*b* to be attached onto the pivot shaft 55. The attachment hole 56*b* has an inner diameter greater than or equal to 105% and less than or equal to 115% of the outer diameter of the pivot support portion 55*b* of the pivot shaft 55. When the outer diameter of the pivot support portion 55*b* is 3.5 mm, for instance, the inner diameter of the attachment hole 56*b* is in a range of 3.68 mm to 4 mm. In consideration of vibration and the like, the inner diameter of the attachment hole 56*b* is preferably set to roughly 3.8 mm when the outer diameter of the pivot shaft 55 is 3.5 mm. In this case, a clearance of maximally 0.3 mm is produced between the pivot shaft 55 and the attachment hole 56*b* of the hitting member 56. The hitting member 56 is thereby attached onto the pivot shaft 55 while being allowed to move at a distance of 0.3 mm (an example of a predetermined distance) along the radial direction of the pivot shaft 55. In FIG. 6, a large bottom-side clearance is therefore produced between the attachment hole 56*b* and the pivot support portion 55*b* due to gravity.

A stuck phenomenon is consequently avoided between the rotation member 54 and the hitting member 56. As described above, the hitting member 56 is herein attached onto the pivot shaft 55 while being allowed to radially move at a predetermined distance. Even in a contact state almost producing a stuck phenomenon, the hitting member 56 radially moves away from the contact state for avoiding the stuck phenomenon. Therefore, the drag mechanism 23 smoothly operates. Further, abrasion can be reduced for either the rotation member 54 or the hitting member 56.

According to the present embodiment, a clearance is produced between the outer peripheral surface of the pivot shaft 55 and the inner peripheral surface of the attachment hole 56*b* of the hitting member 56. The clearance is further greater than the clearance for clearance fit defined by the standards such as JIS (Japanese Industrial Standard). Therefore, a predetermined distance can be largely ensured, which is defined as a difference between the inner diameter and the outer diameter.

The hitting member 56 includes a positioned convex 56*c* radially protruding from the outer peripheral surface thereof. The positioned convex 56*c* resides roughly opposite to the claw portion 56*a* across the 56*b*. The positioned convex 56*c* is set in the silent position by the second positioning protrusion 90*b*. The hitting member 56 further includes an oval holding slit 56*d* in a close position to the claw portion 56*a*. The holding slit 56*d* is formed for holding the drive mechanism 57 therein. Yet further, the hitting member 56 includes a holding hole 56*e* for holding the urging member 58. The holding hole 56*e* is positioned on the radial outside of the attachment hole 56*b* separated away from the holding slit 56*d*. As illustrated in FIG. 4, the drive mechanism 57 includes a drive member 60 having a question-mark shape. As illustrated in FIG. 6, the drive member 60 is an elastic wire member. The drive member 60 includes a circular-arc frictional coupling portion 60*a* and a hook portion 60*b*. The frictional coupling portion 60*a* is frictionally coupled and attached to the bottom of the attachment groove 54*c* of the member attachment portion 54*b*. The hook portion 60*b* is bent radially outwardly from the frictional coupling portion 60*a*. The tip of the hook portion 60*b* is held by the holding slit 56*d* of the hitting member 56. The frictional coupling portion 60*a* has an inner diameter less than the outer diameter of the attachment groove 54*c*. The frictional coupling portion 60*a* is thereby frictionally coupled to the attachment groove 54*c*. Friction of the frictional coupling portion 60*a* is increased in proportion to reduction in the inner diameter of the frictional coupling portion 60*a*. When friction is increased, greater force is required to rotate the handle 2 for rotating the spool 12 in the fishing-line winding direction. Therefore, it is preferable to reduce friction as much as possible.

The drive member 60 is rotated by the frictional coupling portion 60*a* in the same direction as the rotation member 60 when the rotation member 60 is rotated. Accordingly, the hitting member is allowed to move from the sound producing position to the silent position and vice versa.

The urging member 58 is a torsion coil spring including a coil portion 58*a*, a first end 58*b* and the second end 58*c*. The coil portion 58*a* is wound around the outer peripheral surface of the pivot shaft 55. The first end 58*b* is extended from one end of the coil portion 58*a*. The first end 58*b* is held by the holding hole 56*e* of the hitting member 56. On the other hand, the second end 58*c* is extended from the other end of the coil portion 58*a*. The second end 58*c* is held by the holding recess 90*c* of the attachment collar 90 forming a part of the reel unit 1. The second end 58*c* is disposed on a first end 90*f* within the holding recess 90*c* when the hitting member 56 is disposed in the silent position as illustrated in FIG. 7. On the other hand, the second end 58*c* is disposed on a second end 90*g* within the holding recess 90*c* when the hitting member 56 is disposed in the sound producing position as illustrated in FIG. 8. Within the holding recess 90*c*, the first end 90*f* is herein disposed on the upstream of the second end 90*g* in a pivot direction from the silent position to the sound producing position. The urging member 58 does not urge the hitting member 56 when being disposed in the sound producing position as illustrated in FIG. 8. In other words, the silent position is set as a position where the urging member 58 does not urge the hitting member 56. Meanwhile, the urging member 58 urges the hitting member 56 towards the sound producing position when the hitting member 56 is pressed by the rotation member 54 and pivots towards opposite to the silent position across the sound producing position.

The hitting member 56 is urged by the torsion coil spring wound around the pivot shaft. Therefore, the hitting member 56 can be vibrated with a compact structure by setting the hitting member 56 in the sound producing position when the torsion coil spring is under a free state.

Reel Actions in Actual Fishing

In fishing, the clutch lever 17 is firstly slid and set in the clutch off position for setting the clutch mechanism 21 in the clutch off state. The fishing rod is cast under the condition for releasing the fishing line from the spool 12. The spool 12 is herein rotated in the fishing-line releasing direction. However, the main gear 31 is not rotated because the clutch mechanism 21 is set in the clutch off state. The drag sound producing mechanism 27 does not thereby produce sounds. When a tackle lands in water, the handle 2 is slightly rotated in the fishing-line winding direction. The clutch return mechanism 37 is accordingly used for the clutch cam 34 to be moved to the clutch on position. When the clutch cam 34 is moved to the clutch on position, the clutch yoke 35 is pressed by the coil spring 44 and thereby retracted. Accordingly, the pinion gear 32 is moved to the clutch on position and the clutch mechanism 21 is set in the clutch on state. The clutch lever 17 is also herein pressed by the clutch cam 34 and returned to the clutch on position.

Under the condition, an angler waits for a fish to be hooked by the tackle. When a fish is hooked by the tackle, the handle 2 is rotated in the fishing-line winding direction for pulling the hooked fish. The main gear 31 is herein rotated in the fishing-line winding direction (i.e., a clockwise direction in FIG. 3). In conjunction, the rotation member 54 and the drive member 60 frictionally coupled thereto are rotated in the fishing-line winding direction. The drive member 60, rotating in the fishing-line winding direction, causes the hitting member 56 to pivot in the counterclockwise direction in FIG. 3. The hitting member 56, which pivots in the counterclockwise direction, is abutted to the second positioning protrusion 90*b* of the attachment collar 90 in the silent position. The hitting member 56 is thus set in the silent position as illustrated in FIG. 7. The second end 58*c* of the urging member 58 is herein moved from the second end 90*g* to the first end 90*f* within the holding recess 90*c*. Therefore, the urging member 58 does not produce urging force. The drive member 60 is herein only required to produce small friction enough to cause the hitting member 56 to pivot. When the hitting member 56 is set in the silent position, the drive member 60 stops rotating and slippage occurs between the drive member 60 and the rotation member 54. However, the drive member 60 is required to produce small friction for causing the hitting member 56 to pivot. Therefore, rotational resistance due to friction will be reduced. Consequently, it is possible to inhibit reduction in rotational efficiency due to frictional coupling of the drive mechanism 57 in winding the fishing line.

The drag mechanism 23 is activated when the fish is hooked by the tackle, and when fish pulls the fishing line with a force greater than or equal to a predetermined drag force under the condition. Specifically, the spool 12 is rotated in the fishing-line releasing direction under the clutch on state and the main gear 31 is reversely rotated in the fishing-line releasing direction (i.e., the counterclockwise direction in FIG. 3). However, the one-way clutch 86 herein prevents the handle shaft 30 from reversely rotating in the fishing-line releasing direction. The main gear 31 is accordingly rotated in the fishing-line releasing direction while being braked by the predetermined drag force. When the main gear 31 is rotated in the fishing-line releasing direction, the rotation member 54 is also rotated in the fishing-line releasing direction. When the rotation member 54 is rotated in the fishing-line releasing direction, the drive member 60 is rotated in the fishing-line releasing direction. The drive member 60 herein pulls the hitting member 56 for causing the hitting member 56 to pivot in the clockwise direction from the silent position (see FIG. 7) to the sound producing position (see FIG. 8) where the hitting member 56 is allowed to make contact with the rotation member 54.

Figure 9:
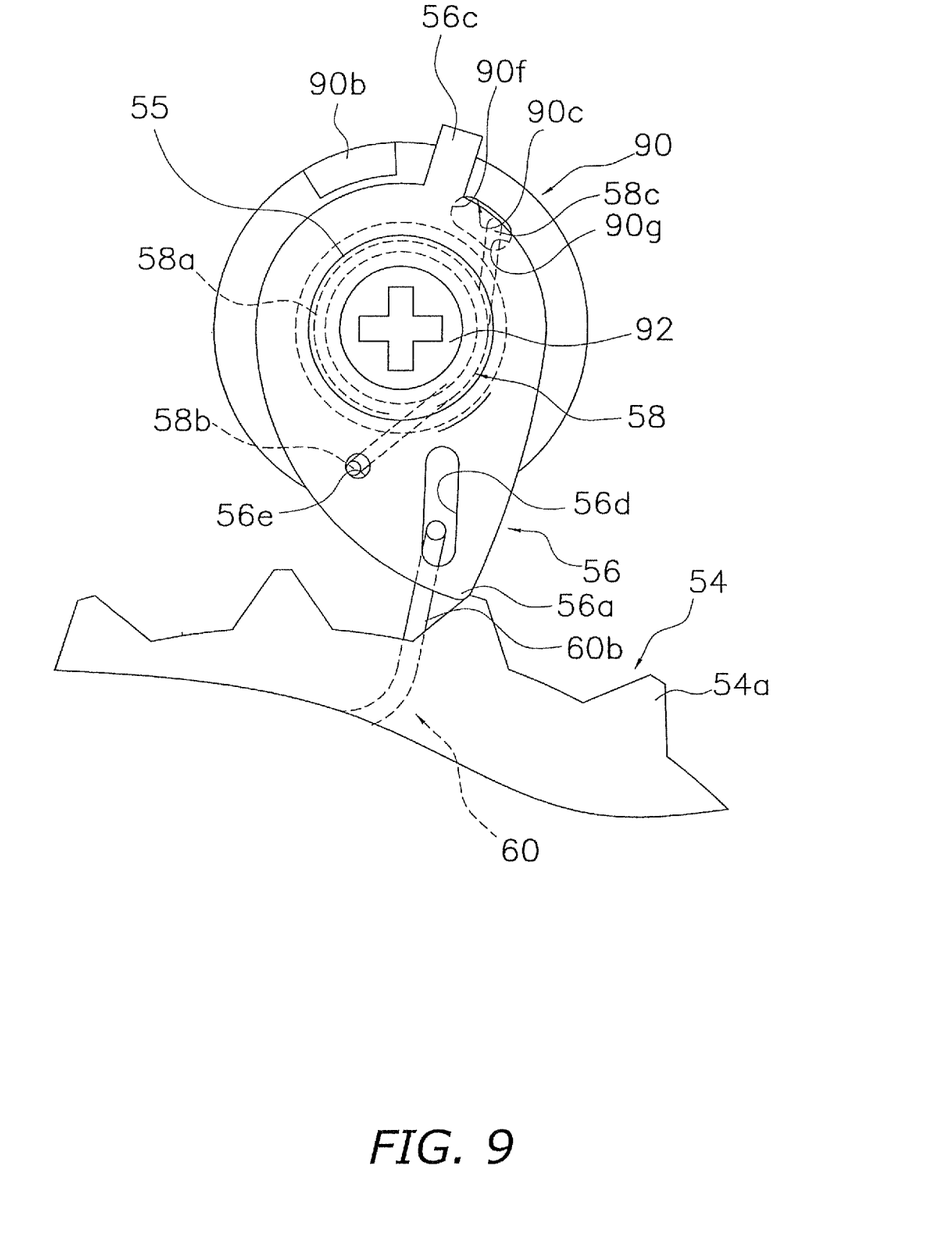
FIG. 9 is a front fragmental view illustrating a contact state almost producing a stuck phenomenon.

When the hitting member 56 reaches the sound producing position, the second end 58*c* of the urging member 58 is moved from the first end 90*f* to the second end 90*g* within the holding recess 90*c*. When the hitting member 56 further pivots across the sound producing position, the urging member 58 urges the hitting member 56 towards the sound producing position. Accordingly, the hitting member 56, which is urged by the urging member 58, repeatedly hits the sound producing convexes 54*a* of the rotation member 54 configured to rotate in conjunction with the main gear 31. The drag sound producing mechanism 27 thus produces sounds. Note the hitting member 56 is allowed to radially move away from the pivot shaft 55 at a predetermined distance (e.g., 0.3 mm) even when the tip of the hitting member 56 and the tip of a given sound producing convex 54*a* make contact with each other and a stuck phenomenon is thereby produced at the onset of producing sounds as illustrated in FIG. 9. When the given sound producing convex 54*a* presses the hitting member 56, the hitting member 56 moves away from the press-contact state for avoiding occurrence of a stuck phenomenon.

Features (A) The drag sound producing mechanism 27 is configured to produce sounds when the drag function is performed by the drag mechanism 23 in a dual-bearing reel configured to wind the fishing line about the axis parallel to the handle shaft 30 rotatably attached to the reel unit 1. The drag sound producing mechanism 27 includes the rotation member 54, the pivot shaft 55, the hitting member 56, the drive mechanism 57 and the urging member 58. The rotation member 54 is attached onto the handle shaft 30 while being allowed to unitarily rotate with the main gear 31. The rotation member 54 includes a plurality of the sound producing convexes 54*a* circumferentially formed on the outer peripheral surface thereof at predetermined intervals. The pivot shaft 55 is attached to the reel unit 1. The hitting member 56 is attached onto the pivot shaft 55. The hitting member 56 is allowed to pivot between the silent position separated away from the sound producing convexes 54*a* and a position where the hitting member 56 pivots towards opposite to the silent position across the sound producing position contactable with the sound producing convexes 54*a*. Further, the hitting member 56 is allowed to radially move at a predetermined distance. The drive mechanism 57 is configured to cause the hitting member 56 to pivot from the sound producing position to the silent position in conjunction with rotation of the main gear 31 in the fishing-line winding direction. The urging member 58 is configured to urge the hitting member 56 to the sound producing position.

The hitting member 56 is allowed to move from the sound producing position to the silent position and vice versa only with the drive mechanism 57. Therefore, the urging member 58 is only required to urge the hitting member 56 towards the sound producing position when pivoting towards opposite to the silent position across the sound producing position.

The drag sound producing mechanism 27 does not produce sounds when the rotation member 54, including the sound producing convexes 54*a* on the outer periphery thereof, is rotated in the fishing-line winding direction. This is because the drive mechanism 57 herein sets the hitting member 56 in the silent position. In contrast, the drag sound producing mechanism 27 produces sounds when the drag function is performed by the drag mechanism 23 and the rotation member 54, together with the main gear 31, is rotated in the fishing-line releasing direction. This is because the hitting member 56 is disposed in the sound producing position by the action of the urging member 58 or the drive mechanism 57. When being positioned in the sound producing position, the hitting member 56, urged by the urging member 58, repeatedly hits a plurality of the sound producing convexes 54*a* and thus produces sounds. When the tip of the hitting member 56 and the tip of a given sound producing convex 54*a* make contact with each other and a stuck phenomenon is almost produced in the drag activation, the hitting member 56 radially moves because the hitting member 56 is attached onto the pivot shaft 55 while being allowed to radially move at a predetermined distance. Occurrence of a stuck phenomenon is consequently avoided between the rotation member 54 and the hitting member 56. Thus, the hitting member 56 is attached onto the pivot shaft 55 while being allowed to radially move at a predetermined distance. Even if a contact state is produced and a stuck phenomenon is almost produced, the hitting member 56 radially moves away from the contact state. Occurrence of a stuck phenomenon is accordingly avoided. Therefore, the drag mechanism 23 smoothly operates. Further, abrasion can be reduced in either the rotation member 54 or the hitting member 56.

(B) In the drag sound producing mechanism 27, the hitting member 56 includes the attachment hole 56*b* to be attached onto the pivot shaft 55. The attachment hole 56*b* has an inner diameter greater than or equal to 105% and less than or equal to 115% of the outer diameter of the pivot shaft 55. In this case, a clearance is formed between the outer peripheral surface of the pivot shaft 55 and the inner peripheral surface of the attachment hole 56*b* of the hitting member 56. The clearance is herein further greater than a clearance for clearance fit defined by the standards such as JIS (Japanese Industrial Standard). Therefore, a predetermined distance can be largely ensured, which is defined as a difference between the inner diameter and the outer diameter.

(C) In the drag sound producing mechanism 27, the drive mechanism 57 is configured to cause the hitting member 56 to pivot from the silent position to the sound producing position in conjunction with rotation of the main gear 31 in the direction opposed to the fishing-line winding direction. Only with the drive mechanism 57, the hitting member 56 is herein allowed to move from the sound producing position to the silent position and vice versa. Therefore, the urging member 58 is only required to urge the hitting member 56 towards the sound producing position when the hitting member 56 pivots across the sound producing position.

(D) In the drag sound producing mechanism 27, the rotation member 54 includes the circular-shaped member attachment portion 54*b* having a diameter less than the diameter of the outer peripheral surface thereof. Further, the drive mechanism 57 includes the question-mark shaped drive member 60 made of an elastic wire. The drive member 60 includes the frictional coupling portion 60*a* and the hook portion 60*b*. The frictional coupling portion 60*a* is a circular-arc portion frictionally coupled and attached to the member attachment portion 54*b*. The hook portion 60*b* is bent radially outwardly from the frictional coupling portion 60*a* and the tip thereof is held by the hitting member. When the rotation member 54 is herein rotated, the drive member 60 is rotated by the frictional coupling portion 60*a* in the same direction as the rotation member 54. Accordingly, the hitting member 56 is allowed to be moved from the sound producing position to the silent position and vice versa.

(E) In the drag sound producing mechanism 27, the urging member 58 is a torsion coil spring including the coil portion 58*a*, the first end 58*b* and the second end 58*c*. The coil portion 58*a* is wound around the pivot shaft 55. The first end 58*b* is extended from one end of the coil portion 58*a* and is held by the hitting member 56. On the other hand, the second end 58*c* is extended from the other end of the coil portion 58*a* and is held by the reel unit 1. The hitting member 56 is herein urged by the torsion coil spring wound around the pivot shaft 55. Therefore, the hitting member 56 can be vibrated with a compact structure by setting the hitting member 56 in the sound producing position when the torsion coil spring is under a free state.

(F) In the drag sound producing mechanism 27, the second end 58*c* of the urging member 58 is held by the holding recess 90*c* recessed in the reel unit 1 along a circular-arc about the pivot center X of the pivot shaft 55. The second end 58*c* is herein allowed to move within the holding recess 90*c* when the main gear 31 changes its rotational direction in response to change in the rotational direction of the spool 12. Therefore, the drive member 60 is required to have small force for driving the hitting member 56. Friction of the frictional coupling portion 60*a* of the drive member 60 can be thereby reduced. It is consequently possible to inhibit reduction in rotational efficiency due to frictional coupling of the drive member 60 in winding the fishing line even when the frictional coupling portion 60*a* is constantly frictionally coupled to the rotation member 54.

(G) In the drag sound producing mechanism 27, the first end 90*f* of the holding recess 90*c* is disposed on the upstream of the second end 90*g* of the holding recess 90*c* in the pivot direction from the silent position to the sound producing position. The second end 58*c* of the urging member 58 is disposed on the first end 90*f* of the holding recess 90*c* when the hitting member 56 is positioned in the silent position. On the other hand, the second end 58*c* is disposed on the second end 90*g* of the holding recess 90*c* when the hitting member 56 is positioned in the sound producing position. In this case, urging force of the urging member 58 does not act between the sound producing position and the silent position by configuring the urging member 58 to cause the hitting member 56 to be set in sound producing position when the second end 58*c* of the urging member 58 is disposed on the second end 90*g*. Therefore, it is possible to further reduce friction of the frictional coupling portion 60*a* and inhibit increase in rotational force due to frictional coupling in winding the fishing line.

Other Exemplary Embodiments

An exemplary embodiment of the present invention has been described above. However, the present invention is not limited to the aforementioned exemplary embodiment. A variety of changes can be made for the present invention without departing from the scope of the present invention.

(a) In the aforementioned exemplary embodiment, the drive mechanism 57 is frictionally coupled to the rotation member 54. However, the target for attaching the drive mechanism 57 is not limited to the rotation member 54. For example, the drive mechanism 57 may be frictionally coupled to the main gear 31.

(b) In the aforementioned exemplary embodiment, the drive mechanism is configured to move the hitting member from the sound producing position to the silent position and vice versa. However, the method of moving the hitting member between the sound producing position and the silent position is not limited to the above. For example, the drive mechanism may be configured to move the hitting member from the sound producing position to the silent position, whereas the urging member may be configured to move the hitting member from the silent position to the sound producing position. This is achieved by setting the urging force of the drive mechanism to be greater than the urging force of the urging member.

(c) In the exemplary embodiment, the drive mechanism is made up of the drive member attached to the member configured to unitarily rotate with the main gear. However, the drive mechanism is not limited to the above. When a claw-type one-way clutch is formed by a ratchet wheel and a claw member meshing with the ratchet wheel, for instance, the claw member includes a holding plate for inserting and holding the ratchet wheel therein. The claw member may be used as the drive mechanism for moving the hitting member between the sound producing position and the silent position.

(d) In the aforementioned exemplary embodiment, the rotation member is attached onto the handle shaft and coupled to the main gear 31 while being allowed to unitarily rotate therewith. In the present invention, however, the rotation member is not limited to the above. For example, a gear member, meshing with the main gear, may be used as a rotation member.

(e) In the aforementioned exemplary embodiment, the attachment collar 90 and the collar fixation bolt 91 are added as members for forming a part of the second side plate 9. The structure allows the drag sound producing mechanism 27 to be attached to the reel units of the well-known type only by executing slight processing (e.g., formation of the positioning slit 9c) for the reel units. In the present invention, however, the structure for attaching the drag sound producing mechanism 27 is not limited to the above. For example, an attachment collar, including a pivot shaft raised therefrom, may be integrally formed with the reel unit (e.g., the second side plate). In this case, a collar fixation bolt is not required.

(f) In the aforementioned exemplary embodiment, the round dual-bearing reel has been exemplified for explaining the present invention. However, any suitable types may be adopted for the dual-bearing reel of the present invention, including the non-round bait-casting reels, the electric reels, the lever-drag reels and the like.

Advantageous Effects of the Invention

The hitting member is attached onto the pivot shaft while being radially movable at a predetermined distance. Even in a contact state almost producing a stuck phenomenon, the hitting member radially moves away from the contact state for avoiding a stuck phenomenon. In other words, the drag mechanism smoothly operates. Further, abrasion can be reduced in either the rotation member or the hitting member.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing descriptions of the embodiments according to the present invention are provided for illustration only, and not for the purpose of limiting the invention as defined by the appended claims and their equivalents.

What is claimed is:

1. A reel drag sound producing device for producing sound in conjunction with a drag function of a dual-bearing reel having a reel unit with a main gear, the drag sound producing device comprising:
    a rotation member being disposed in the reel unit to be rotated unitarily with the main gear, the rotation member including a plurality of sound producing convexes circumferentially aligned on an outer peripheral surface of the rotation member at a predetermined interval;
    a pivot shaft being disposed in the reel unit;
    a hitting member being disposed onto the pivot shaft, the hitting member being disposed to be moved in a first direction between a silent position and a sound producing position and moved in a radial direction for a predetermined distance, the hitting member being separated at the silent position from the sound producing convexes, the hitting member being in contact at the sound producing position with the sound producing convexes to produce the sound with the drag function;
    a drive mechanism being configured to move the hitting member between the sound producing position and the silent position in conjunction with rotation of the main gear in a fishing-line winding direction; and
    an urging member being configured to urge the hitting member towards the sound producing position.

2. The reel drag sound producing device according to claim 1, wherein
    the hitting member includes an attachment hole in which the pivot shaft is inserted, and
    the attachment hole has an inner diameter of greater than or equal to 105 percent of an outer diameter of the pivot shaft and less than or equal to 115 percent of the outer diameter of the pivot shaft.

3. The reel drag sound producing device according to claim 1, wherein
    the drive mechanism is configured to move the hitting member from the silent position to the sound producing position in conjunction with rotation of the main gear in a direction opposite to the fishing-line winding direction.

4. The reel drag sound producing device according to claim 3, wherein
    the rotation member includes a member attachment portion having a circular shape and a diameter less than a diameter of the outer peripheral surface,
    the drive mechanism includes a drive member made of an elastic wire, the drive member having a circular part which is partially disconnected, and a straight part connected to an end of the circular part,
    the drive member has a frictional coupling portion having a circular-arc shape and a hook portion being bent radially outwardly from the frictional coupling portion,
    the frictional coupling portion is frictionally coupled and attached to the member attachment portion, and
    a tip of the hook portion is held by the hitting member.

5. The reel drag sound producing device according to claim 4, wherein
    the urging member is a torsion coil spring, and
    the urging member includes
        a coil portion being wound around the pivot shaft,
        a first end extending from one end of the coil portion, the first end held by the hitting member, and a second end extending from the other end of the coil portion, the second end being held by the reel unit.

6. The reel drag sound producing device according to claim 5, wherein the second end of the urging member is held by a holding recess on the pivot shaft, and the holding recess has a circular-arc shape with a center of the pivot shaft as a center of the circular-arc shape.

7. The reel drag sound producing device according to claim 6, wherein a first end of the holding recess is disposed upper stream than a second end of the holding recess in a direction from a position at which the hitting member is at the silent position to a position at which the hitting member is at the sound producing position, the second end of the urging member is configured at the first end of the holding recess when the hitting member is disposed in the silent position, and the second end of the urging member is configured at the second end of the holding recess when the hitting member is disposed in the sound producing position.

* * * * *